(12) United States Patent
Hornickel

(10) Patent No.: US 11,396,036 B2
(45) Date of Patent: Jul. 26, 2022

(54) LUBRICATION RING FOR A MECHANICAL EXPANDER FOR SIZING LARGE PIPES

(71) Applicant: SMS group GmbH, Düsseldorf (DE)

(72) Inventor: Sarah Hornickel, Düsseldorf (DE)

(73) Assignee: SMS group GmbH, Düsseldorf (DE)

( * ) Notice: Subject to any disclaimer, the term of this patent is extended or adjusted under 35 U.S.C. 154(b) by 59 days.

(21) Appl. No.: 17/046,335

(22) PCT Filed: Apr. 12, 2019

(86) PCT No.: PCT/EP2019/059548
§ 371 (c)(1),
(2) Date: Oct. 9, 2020

(87) PCT Pub. No.: WO2019/197664
PCT Pub. Date: Oct. 17, 2019

(65) Prior Publication Data
US 2021/0039154 A1    Feb. 11, 2021

(30) Foreign Application Priority Data

Apr. 12, 2018 (DE) .................... 10 2018 205 600.5
Mar. 28, 2019 (DE) .................... 10 2019 204 376.3

(51) Int. Cl.
| | |
|---|---|
| B21D 37/18 | (2006.01) |
| B21D 41/02 | (2006.01) |
| B33Y 10/00 | (2015.01) |
| F16N 1/00 | (2006.01) |

(Continued)

(52) U.S. Cl.
CPC ............ B21D 37/18 (2013.01); B21D 41/028 (2013.01); B33Y 10/00 (2014.12); F16N 1/00 (2013.01); B22F 5/10 (2013.01); B22F 7/08 (2013.01)

(58) Field of Classification Search
CPC ... B22F 5/10; B22F 7/08; B22F 7/062; B21D 39/20; F16N 7/00
See application file for complete search history.

(56) References Cited

U.S. PATENT DOCUMENTS 3,397,564 A * 8/1968 Schroeder ............... B21C 37/30
                                                                72/208
3,572,081 A * 3/1971 Alexander ............. B21C 37/30
                                                                72/399

(Continued)

FOREIGN PATENT DOCUMENTS

| CN | 201046483 | 4/2008 |
|---|---|---|
| CN | 201046483 Y * | 4/2008 |

(Continued)

OTHER PUBLICATIONS

CN-201046483-Y machine translation (Year: 2008).*

(Continued)

*Primary Examiner* — Jacob J Cigna
*Assistant Examiner* — Michael W Hotchkiss
(74) *Attorney, Agent, or Firm* — Smartpat PLC

(57) ABSTRACT

A lubrication ring for a mechanical expander (1) for sizing large pipes comprises a conventionally manufactured ring (12) made of steel, in particular construction steel. Fluid bores are provided in the ring (12). A part (13) of the lubrication ring (6) is manufactured by an additive manufacturing technology.

7 Claims, 2 Drawing Sheets

(51) Int. Cl.
   *B22F 7/08* (2006.01)
   *B22F 5/10* (2006.01)

(56) References Cited

U.S. PATENT DOCUMENTS

| | | | | |
|---|---|---|---|---|
| 4,422,317 | A * | 12/1983 | Mueller | B21D 39/203 |
| | | | | 72/58 |
| 4,944,173 | A * | 7/1990 | Swars | B21D 39/203 |
| | | | | 29/523 |
| 5,101,653 | A * | 4/1992 | Hermes | B21D 39/20 |
| | | | | 72/393 |
| 7,077,213 | B2 * | 7/2006 | Cook | E21B 43/14 |
| | | | | 166/207 |
| 10,287,912 | B2 * | 5/2019 | Beer | F01D 25/125 |
| 10,385,432 | B2 * | 8/2019 | Kilmer | C22C 21/08 |
| 10,702,902 | B2 * | 7/2020 | Iguchi | B21D 41/02 |
| 2007/0215360 | A1 * | 9/2007 | Shuster | E21B 43/305 |
| | | | | 166/207 |
| 2016/0010469 | A1 * | 1/2016 | Guo | B22F 5/04 |
| | | | | 264/480 |
| 2017/0260997 | A1 | 9/2017 | Mola et al. | |
| 2018/0221958 | A1 * | 8/2018 | Torun | B22F 3/24 |

FOREIGN PATENT DOCUMENTS

| | | | | |
|---|---|---|---|---|
| CN | 203470697 U * | 3/2014 | | |
| CN | 203917670 U | 11/2014 | | |
| CN | 206527243 U | 9/2017 | | |
| DE | 102011106605 | 9/2012 | | |
| EP | 2535124 B1 * | 11/2013 | | B21D 39/20 |
| WO | 2015032228 A1 | 3/2015 | | |
| WO | WO-2015032228 A1 * | 3/2015 | | B21D 39/20 |
| WO | 2016149774 A1 | 9/2016 | | |

OTHER PUBLICATIONS

CN-203470697-U machine translation (Year: 2014).*
EP-2535124-B1 machine translation (Year: 2013).*
WO-2015032228-A1 machine translation (Year: 2015).*

* cited by examiner

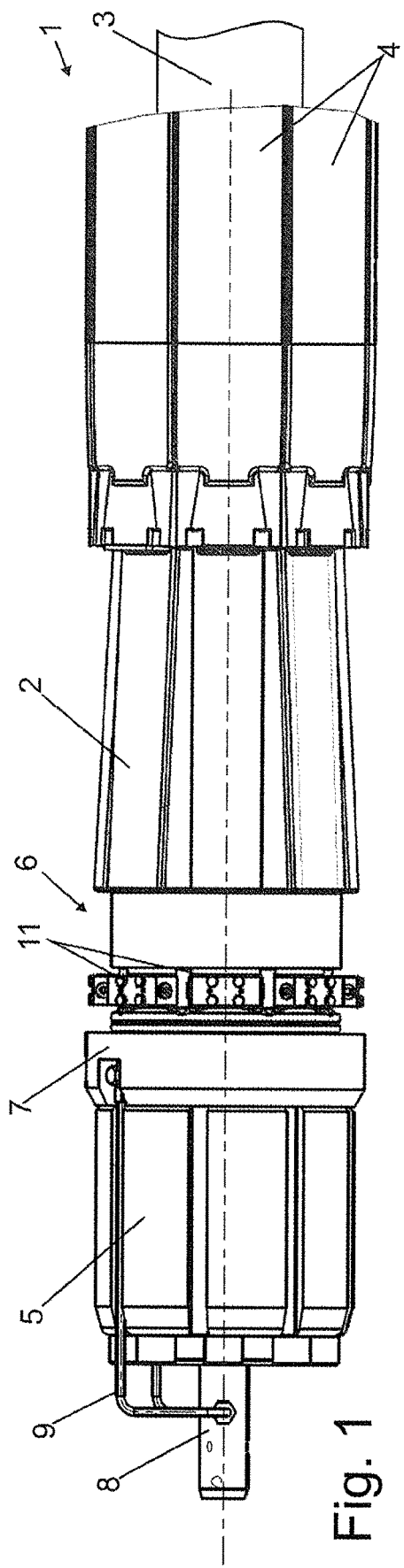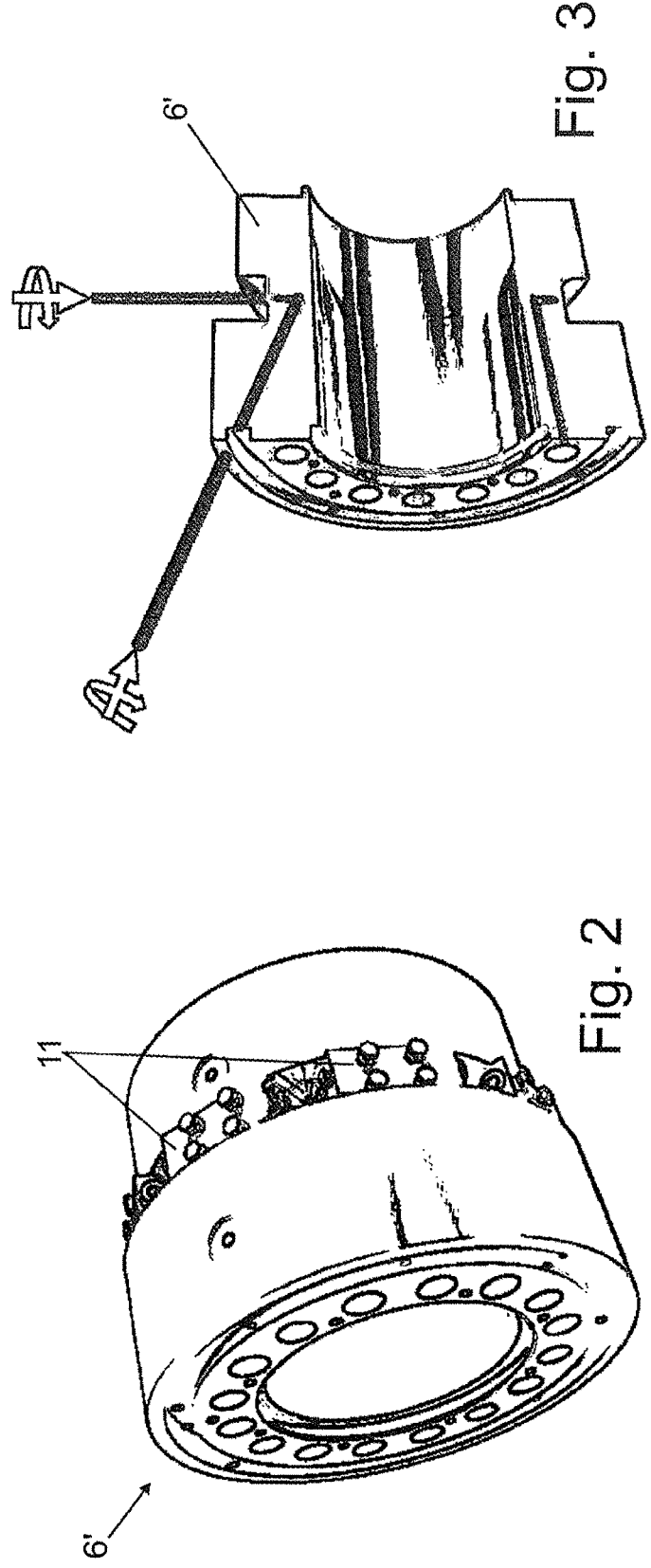

LUBRICATION RING FOR A MECHANICAL EXPANDER FOR SIZING LARGE PIPES

TECHNICAL FIELD

The disclosure relates to a lubrication ring for a mechanical expander for sizing large pipes and a method for manufacturing the same.

BACKGROUND

From the practice of constructing expanders for the sizing of large pipes, arranging a lubrication ring between a wedge moved by a draw bar and a washer is known. The stack of washer, lubricating ring and wedge is subjected to a high force in the direction of the draw bar. The draw bar applies the force to the components. These are moved by the draw bar in the direction of the cylinder. The draw bar is mounted on a cylinder which is extended and retracted by hydraulic pressure. Segments lying on the wedge are pressed radially outwards and expand a pipe to be sized. Lubricant to lubricate the gap between the wedge and the segments is directed through the lubrication ring to bores in the wedge, wherein the lubrication ring has two common rails and dual line distributors for controlling the flow of lubricant.

In the manufacture of large pipes, they are sized for roundness and dimensional accuracy after internal and external seam welding with the aid of the mechanical expander. During each expansion process, a high surface pressure and thus friction between the surfaces of the segments and the wedge arises. The friction is reduced by a defined lubrication. In order to guide the lubricant to the appropriate points, the lubrication ring serves as a lubricant distributor and also as a conductor of the expander oil. So far, the lubrication rings have been manufactured using conventional manufacturing methods. The individual hydraulic channels are partially drilled in two planes.

Some approaches use hose assemblies for the distribution and transfer of the expander oil or bent pipes to fulfill this function.

WO 2015/032228 A1 describes an expander for the sizing of pipes, in which a lubrication ring of conventional design is provided. Such lubrication rings are manufactured from steel parts by deformation, machining and other conventional techniques.

WO 2016/149774 A1 describes an impeller as a rapidly rotating component of a turbo compressor. A rotationally symmetric shaped base of the impeller is manufactured by additive manufacturing, wherein a further structure can be subsequently applied by additive manufacturing.

US 2017/0260997 A1 describes the manufacture of an impeller as a rapidly rotating component of a turbomachine using hot isostatic pressing. As a possible alternative manufacturing method, reference is generally made to additive manufacturing.

DE 10 2011 106 605 B3 describes a mechanical tension expander without the thematic developing of a manufacturing method.

SUMMARY

It is the object of the disclosure to specify a simplified and reproducible manufacture of the lubrication ring for the distribution and transfer of the expander oil. Furthermore, it is the object of the invention to specify a reduction of the component dimensions for the manufacture of large pipes with diameters of less than or equal to 14 inches.

This object is achieved by a lubrication ring for a mechanical expander for sizing large pipes which includes a conventionally manufactured ring made of steel, in particular construction steel. Fluid bores are provided in the ring. A part of the lubrication ring is manufactured by an additive manufacturing technology.

With a preferred embodiment, the additive manufactured part consists of a high-strength steel.

Further generally advantageous, the large pipes have a diameter of 14 inches or less.

Particularly preferably, it is provided that the additive manufactured part has circumferential common rails to guide the lubricant.

For the general optimization of the lubricant distribution, it can be advantageously provided that the additive manufactured part is designed to integrate the function of dual line distributors.

The disclosure also relates to a method for manufacturing a lubrication ring, characterized by the following steps:

a. Manufacture of the ring from steel in a conventional manner;
b. Alignment and mounting of the ring as a blank in a printer build space;
c. Application of metal powder layers and fusing with the aid of a laser on the blank.

The lubrication ring can be used both in new systems and in existing systems as a retrofit solution. Keywords for the invention are the following: Tube welding systems, SAW pipes, mechanical expander, expander tool, sizing of large pipes.

The purpose of the disclosure is to provide a simplified and reproducible manufacture of expander tools for the sizing of large pipes with diameters of 14 inches and smaller.

Disadvantages of previously known solutions: In particular with expander tools for small pipe diameters (e.g., 14 inches and smaller), conventional manufacturing reaches its limits. The reason for this is the limited installation space in the lubrication ring, which makes positioning and manufacturing of the fluid bores more difficult. This is because, in order to divert a fluid by 90°, two bores are required, one in the vertical direction and the other in the horizontal direction. This makes the manufacture of lubrication rings for 14-inch pipes very complex and risky, since, in some areas, only a few millimeters remain until a collision with another hydraulic bore occurs. If this is the case, the part becomes scrap.

The disclosed lubrication ring is a hybrid component that combines conventional and additive manufacturing. The basis is a ring made of a low-strength but inexpensive construction steel on which the more complex part is generated layer-by-layer from a high-strength material by additive manufacturing, also known as 3D printing.

Construction steel with low strength properties is sufficient for the ring, since the critical cross-section is not located in this area of the component. Initially, the through holes for the subsequent assembly and the hydraulic lines are conventionally manufactured in the steel ring. For layer-by-layer structuring, the ring is subsequently aligned and assembled in the printer build space and the metal powder layers are applied to the blank and fused with the aid of a laser. With additive manufacturing, no tool specifies the geometry or the course of the channels, such that they are integrated as compactly as possible, thereby reducing the height of the component. The design is also characterized by the two circumferential common rails. These supply the individual channels to the dual line distributors with expander oil.

Additional measures to improve the lubrication ring: Integration of the function of the dual line distributors in order to ensure the precisely defined expander oil output.

Further advantages of the disclosed lubrication ring: Reduction of the number of seals (leakage possibilities) from 68 to 50, since the connections of the channels are only made through two connection points located on the washer side. Elimination of purchased special seals through the integration of two circumferential common rails, which take over the distribution function and ensure the supply of the channels. Reduction of the component height, such that the surrounding components can also be dimensioned to be smaller. Simplification of the adjacent component, as there is no need to produce bores, some of which run diagonally in three planes. Reduction of the number of parts, the associated lower assembly effort. Protection of know-how.

BRIEF DESCRIPTION OF THE DRAWINGS

In the following, a preferred exemplary embodiment of the lubrication ring is described and explained in more detail on the basis of the attached drawings.

FIG. 1 shows a sectional view through a previously known expander with a lubrication ring in accordance with the invention.

FIG. 2 shows a spatial view of a lubrication ring according to the prior art.

FIG. 3 shows the lubrication ring from FIG. 2 in a partially cut open view with the indicated steps for drilling the bores.

DETAILED DESCRIPTION

Figure 4:
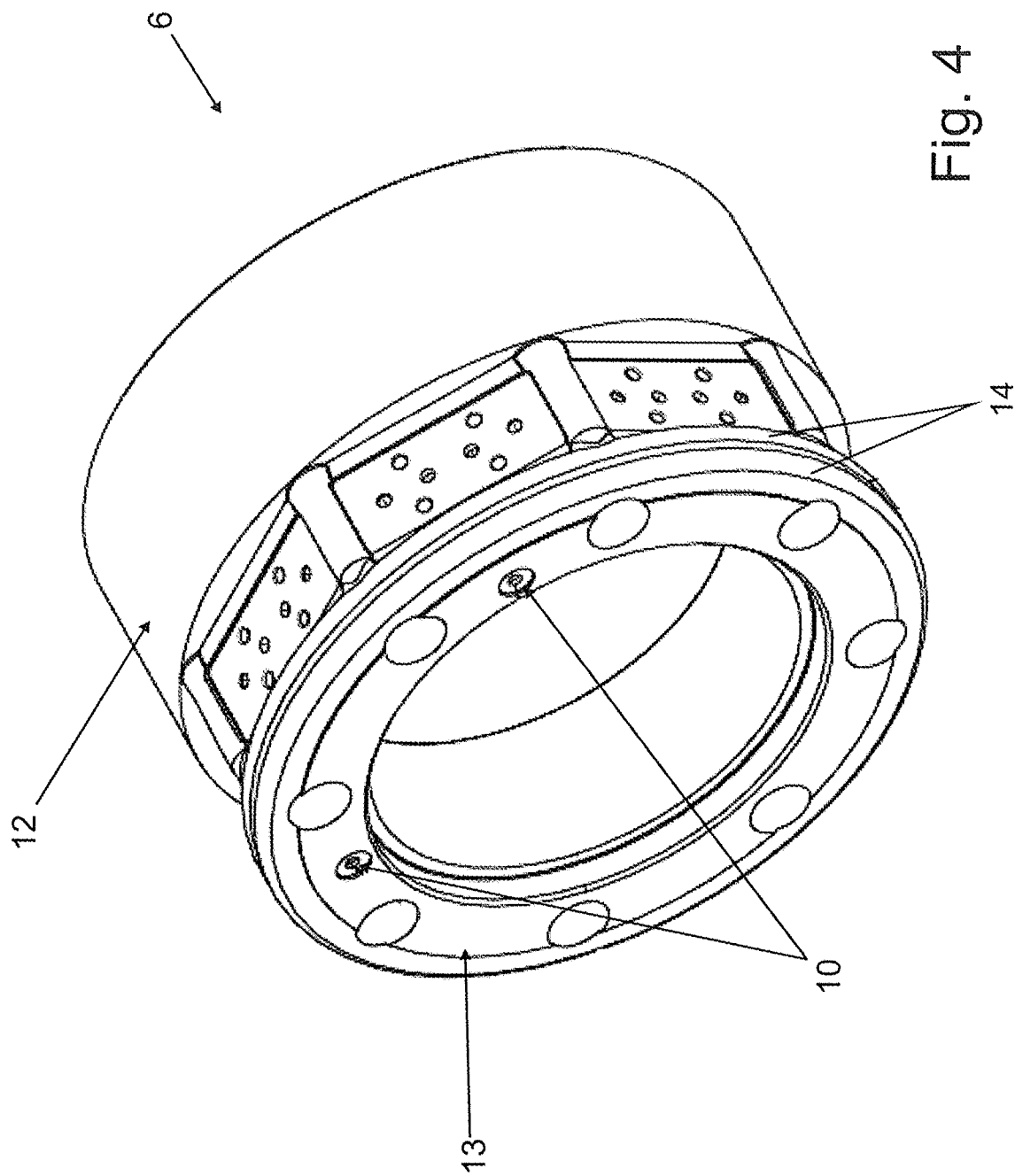
FIG. 4 shows a spatial view of the lubrication ring in accordance with the invention from FIG. 1 or the lubrication ring as a hybrid component, as the case may be.

The expander 1 shown in FIG. 1 comprises a wedge 2, which can be moved relative to oppositely shaped segments 4 via a draw bar 3, such that the segments 4 are pressed radially outwards in order to deform or size a pipe (not shown) from the inside.

The wedge 2 has lubrication channels (not shown) that transport the lubricant into the gap between the wedge 2 and the segments 4.

The wedge 2 is connected to the draw bar by a nut 5. A washer 7 and then a lubricating ring 6 are arranged as a stack between the nut 5 in the pulling direction. The lubricant is fed from a supply journal 8 via external lines 9 to channels of the washer 7. The channels in the washer 7 are connected in axial direction to channels 10 of the lubrication ring 6. Dual line distributors 11 (not shown in FIG. 4), which are supplied for the control of the lubricant flow, are attached to the lubricating ring 6.

FIG. 2 and FIG. 3 show a previously known lubrication ring manufactured in a conventional manner. FIG. 3 illustrates how fluid bores or lubrication channels were previously inserted into the lubrication ring 6 through bores.

The previously known lubrication ring 6' in accordance with FIG. 2 can be provided in the expander according to FIG. 1 as an alternative to the lubrication ring 6 in accordance with the invention according to FIG. 4, or the lubrication ring 6 in accordance with the invention can replace the conventional lubrication ring 6', if necessary with the additional adaptation of the washer 7.

The lubricating ring 6 in accordance with the invention according to FIG. 4 comprises a conventionally manufactured part 12 in the form of a ring, whose shape in this area largely corresponds to the corresponding part of the lubricating ring 6' according to FIG. 2. A part 13 manufactured by additive manufacturing connects in the axial direction to the conventionally manufactured part 12. The additive manufactured part 13 is turned towards the washer 7 and rests against it. Thus, the lubrication ring 6 according to FIG. 4 is designed as a hybrid component. The conventionally manufactured part 12 is made of construction steel. The additive manufactured part 13 consists of high-strength steel.

In the additive manufactured part 13, two circulating common rail lines 14 are provided for the distribution of the lubricant, among others to the dual line distributors 11.

Additive manufacturing: Invention report—Lubrication ring as hybrid component

In the manufacture of large pipes, they are sized for roundness and dimensional accuracy after internal and external seam welding with the aid of the mechanical expander 1. During each expansion process, a high surface pressure and thus friction between the surfaces of the segments and the wedge arises. The friction is reduced by a defined lubrication. In order to guide the lubricant to the appropriate points, the lubrication ring serves as a lubricant distributor and conductor.

In particular with expander tools 1 for small pipe diameters (for example, 14" and smaller), conventional manufacturing reaches its limits. The reason for this is the small installation space in the lubrication ring 6', which makes positioning and manufacturing of the fluid bores more difficult.

Additive manufacturing technology opens up new possibilities. However, the often filigree structures associated with additive manufacturing are difficult to apply, in particular in heavy mechanical engineering. This is because very rough operating conditions often prevail and high forces are required for plastic deformation, which leads to a solid construction of the components.

The solid design was also taken into account in the product development process. The result is a new lubrication ring 6 with a hybrid design, combining the conventional with the additive manufactured design. The basis for the layer-by-layer application is a steel ring 12, in which the first bores for fluid transfer to the wedge 2 are already being produced by conventional means. The ring 12 is aligned and mounted in the printer build space. The ring is then assembled using additive manufacturing technology. With the compact arrangement of the fluid channels, the height to be applied only amounts to 70 mm. Compared to the original design, the maximum dimensions have been reduced by 10% in the outer diameter and by almost 30% in the total component height, which at the same time leads to a reduction in the size of the surrounding components. This is because, with the aid of additive manufacturing technology, channels 10, 14 can be manufactured completely independently of the contour of the production tools and can be designed very compactly in a small installation space.

The novel design is characterized by the two circumferential common rails 14. These supply the individual channels to the dual line distributors 11, in which an exactly defined quantity of lubricant is then discharged. The lubricating oil supply for the two common rails 14 takes place via only two channels 10, which has a great advantage with regard to the number of necessary seals or the number of possible leakage points. This is because the number of leakage points is reduced by 17%. This also eliminates the need for special seals. Furthermore, the lubricant supply via only two channels 10 simplifies the design of the adjacent components, just like the conventionally manufactured washer. The design of the AM area is defined in such a manner that the effort required for subsequent post-processing is kept to a minimum. For this purpose, all angles in the printing direction are selected such that the need for support structures is eliminated. Reworking for the seat of the dual line distributor 11 is also kept as low as possible.

The combination of conventional and additive methods is not only technically convincing, but also economically convincing, and will play an important role in heavy mechanical engineering in the future.

LIST OF REFERENCE SIGNS

1 Expander
2 Wedge
3 Draw bar
4 Segments
5 Nut
6 Lubrication ring
6' Conventional lubrication ring
7 Washer
8 Supply journal
9 External lines
10 Channels of the lubrication ring
11 Dual line distributor
12 Conventionally manufactured part, ring made of steel
13 Part manufactured by additive manufacturing
14 Common rail lines

The invention claimed is:

1. A mechanical expander (1) for sizing pipes, comprising:
a wedge (2), the wedge (2) being movable relative to segments (4) that are pressed radially outward against an inside of the pipes during sizing;
a draw bar (3) for moving the wedge (2), the draw bar (3) being connected to the wedge (2) by a nut (5);
a washer (7) and a lubrication ring (6) stacked between the nut (5) and the wedge (2),
wherein the lubrication ring (6) comprises
a ring (12) made of solid steel;
fluid bores provided in the ring; and
an additive manufactured part (13) made of fused metal powder layers,
wherein the ring (12) made of solid steel is arranged proximal to the wedge (2) and the additive manufactured part (13) is arranged proximal to the washer (7), and
wherein the additive manufactured part (13) includes at least one enclosed lubricant channel which extends from a face proximal to the washer to the fluid bores in the ring (12).

2. The mechanical expander according to claim 1, wherein the additive manufactured part (13) consists of a high-strength steel.

3. The mechanical expander according to claim 1, wherein the lubrication ring is configured for a mechanical expander for sizing pipes having a diameter of 14 inches or less.

4. The mechanical expander according to claim 1, wherein the additive manufactured part (13) includes circumferential common rails (14) to guide a lubricant.

5. The mechanical expander according to claim 1, wherein the additive manufactured part (13) functions as a dual line distributor (11).

6. The mechanical expander according to claim 1, wherein the additive manufactured part (13) includes two lubricant channels which extend from the face proximal to the washer to the fluid bores in the ring (12), wherein each of the two lubricant channels has a single opening in the face proximal to the washer and is in fluid communication with one of two circumferential common rails (14).

7. A method for the manufacturing a lubrication ring of the mechanical expander as in claim 1, comprising the following steps:
machining the ring (12) from solid steel;
aligning and mounting of the ring (12) as a blank in a printer build space;
applying metal powder layers and fusing the metal powder layers with the aid of a laser on the blank.

* * * * *